US008317372B2

(12) United States Patent
Fu et al.

(10) Patent No.: US 8,317,372 B2
(45) Date of Patent: Nov. 27, 2012

(54) LED BULB

(75) Inventors: Heng-Yang Fu, Taipei (TW); Paul Juan, Taipei (TW)

(73) Assignee: LEDWiser, Inc., Sunnyvale, CA (US)

( * ) Notice: Subject to any disclaimer, the term of this patent is extended or adjusted under 35 U.S.C. 154(b) by 0 days.

(21) Appl. No.: 13/010,746

(22) Filed: Jan. 20, 2011

(65) Prior Publication Data

US 2012/0098402 A1 Apr. 26, 2012

(30) Foreign Application Priority Data

Oct. 21, 2010 (TW) ............................... 99135907 A

(51) Int. Cl.
*B60Q 1/06* (2006.01)

(52) U.S. Cl. ........ 362/373; 362/547; 362/555; 362/310; 313/46

(58) Field of Classification Search .................... 313/46; 362/218, 555, 547, 310, 373; 257/100
See application file for complete search history.

(56) References Cited

U.S. PATENT DOCUMENTS 7,341,365 B2 * 3/2008 Basile et al. .................. 362/511
2006/0067077 A1 * 3/2006 Kumthampinij et al. ..... 362/294
2007/0070628 A1 * 3/2007 Chen ............................ 362/249
2007/0086196 A1 * 4/2007 Wong ........................... 362/294
2009/0080205 A1 * 3/2009 Chang et al. .................. 362/373
2010/0314985 A1 * 12/2010 Premysler ...................... 313/46

FOREIGN PATENT DOCUMENTS

TW M389826 10/2010

* cited by examiner

*Primary Examiner* — Mary Ellen Bowman
(74) *Attorney, Agent, or Firm* — David Xue; Goodwin Procter LLP

(57) ABSTRACT

An LED bulb includes: a circuit board having opposite first and second surfaces; a plurality of LEDs disposed on the first surface; and a heat dissipating structure having a heat dissipating board, wherein the heat dissipating board has opposite third and fourth surfaces, the third surface is attached to the second surface of the circuit board, and a plurality of heat dissipating bumps is disposed on the fourth surface and gradually decreases in length from the center toward the periphery of the fourth surface to thereby facilitate air convection around the heat dissipating bumps, thus improving the overall heat dissipating efficiency so as to increase the light emitting efficiency and lifetime of the LED bulb.

7 Claims, 4 Drawing Sheets

LED BULB

BACKGROUND OF THE INVENTION

1. Field of the Invention

The present invention relates to light emitting diode (LED) bulbs, and more particularly, to an LED bulb having a heat dissipating structure disposed therein.

2. Description of Related Art

Since LEDs have advantages of long lifetime, low power consumption and short response time and do not have idling time, the application of the LEDs is increasingly expanded. Particularly, white LEDs are being widely adopted in lighting applications, and conventional halogen or incandescent bulbs are being replaced by the LEDs so as to meet the energy saving and carbon reducing trend.

FIG. 1 is a perspective view of an LED bulb disclosed by Taiwan Utility Model Patent No. M389826. Referring to FIG. 1, the LED bulb 1 comprises a light-transmittable cover 11 with a globe shape, a base 12, and an electrical contact 13. A plurality of light source circuit components, such as LEDs, a circuit board and a transformer (not shown), is disposed inside the base 12 and the cover 11. A heat dissipating structure comprising a plurality of fins 120 each having a plurality of heat dissipating holes 121 is disposed around the periphery of the base 12 such that heat generated by the light source circuit components can be dissipated to the outside through the fins 120. The heat dissipating effect can further be improved by convection through the heat dissipating holes 121.

However, since heat is generated inside the bulb while the heat dissipating structure of the bulb is disposed around the periphery of the base 12 and thermal convection through the heat dissipating holes 121 only reaches the surface of the base 12, the heat cannot be effectively and rapidly dissipated by the heat dissipating structure, thus resulting in high temperature of the bulb. Further, the high temperature of the bulb can adversely affect the light emitting efficiency of the LEDs, cause rapid deterioration of the circuit board, and shorten the lifetime of the bulb.

Therefore, it is imperative to provide an LED bulb with improved heat dissipating efficiency so as to increase the light emitting efficiency and lifetime of the LED bulb.

SUMMARY OF THE INVENTION

Accordingly, the present invention provides an LED bulb, which comprises: a circuit board having a first surface and a second surface opposite to the first surface; a plurality of LEDs disposed on the first surface of the circuit board; and a heat dissipating structure having a heat dissipating board, wherein the heat dissipating board has a third surface and a fourth surface opposite to the third surface, the third surface is attached to the second surface of the circuit board, and a plurality of heat dissipating bumps is disposed on the fourth surface and gradually decreases in length from the center toward the periphery of the fourth surface.

In an embodiment of the present invention, the LED bulb can further comprise a housing disposed around the circuit board and the heat dissipating structure and having a plurality of openings disposed therein and positioned around the heat dissipating bumps.

In an embodiment of the present invention, the housing can have a heat dissipating space formed near the LEDs that generate heat, the heat dissipating structure being disposed in the heat dissipating space.

In an embodiment of the present invention, the fourth surface of the heat dissipating board can have a protruding portion with a height gradually decreasing from the center toward the periphery of the fourth surface.

In an embodiment of the present invention, the heat dissipating structure can be made of metal.

In an embodiment of the present invention, the heat dissipating structure can be formed by die casting.

In an embodiment of the present invention, the heat dissipating bumps can have a triangular pyramid shape, a square pyramid shape, a polygonal pyramid shape, a triangular tapered column shape, a square tapered column shape, a polygonal tapered column shape, a round column shape, a square column shape or a polygonal column shape.

In an embodiment of the present invention, the LED bulb can further comprise a nano-scaled radiation coating disposed on the heat dissipating bumps.

According to the present invention, the heat dissipating bumps that gradually decrease in length from the center toward the periphery of the fourth surface facilitate rapid dissipation of hot air in the center and the openings disposed around the heat dissipating structure also help to dissipate heat, thereby maintaining the LED bulb at a normal temperature so as to increase the light emitting efficiency and lifetime of the LED bulb.

DETAILED DESCRIPTION OF PREFERRED EMBODIMENTS

The following embodiments are provided to illustrate the present invention. Those skilled in the art will readily understand other advantages and functions of the present invention in accordance with the contents disclosed in this specification.

Figure 1:
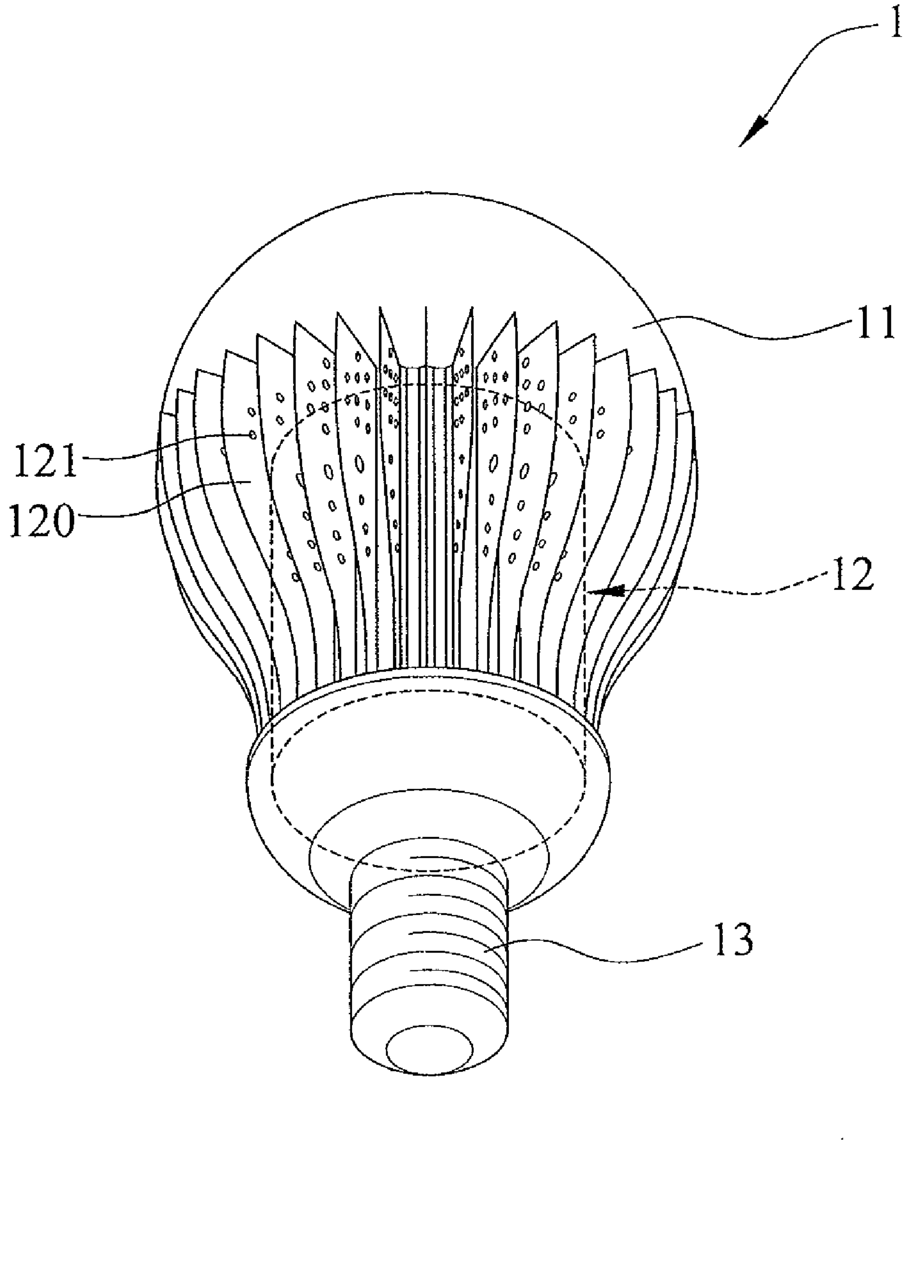
FIG. 1 (PRIOR ART)
FIG. 1 (PRIOR ART) is perspective view of a conventional LED bulb.
Figure 2A:
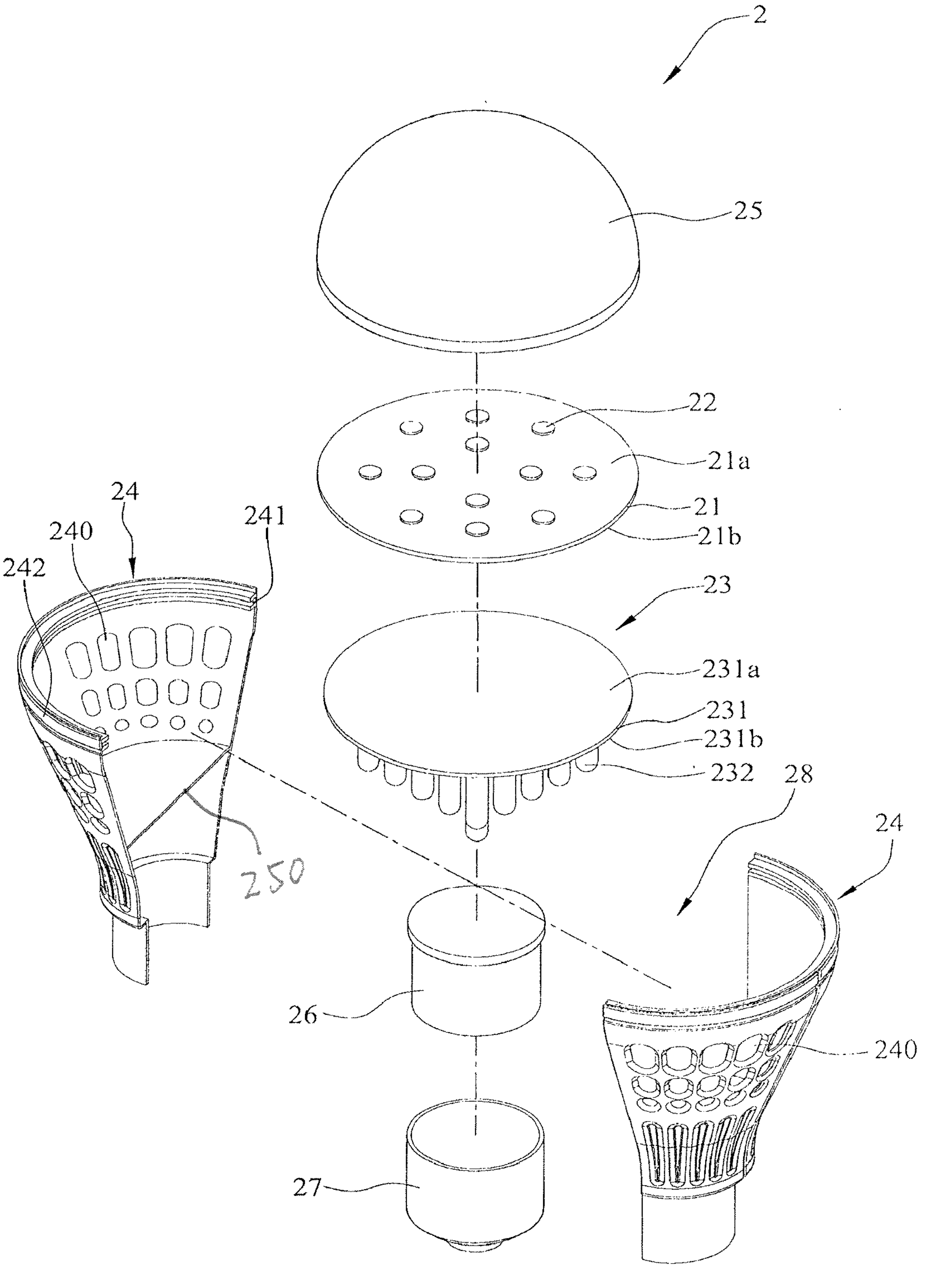
FIGS. 2A and 2B are an exploded view and an assembly view, respectively, of an LED bulb according to the present invention.
Figure 2B:
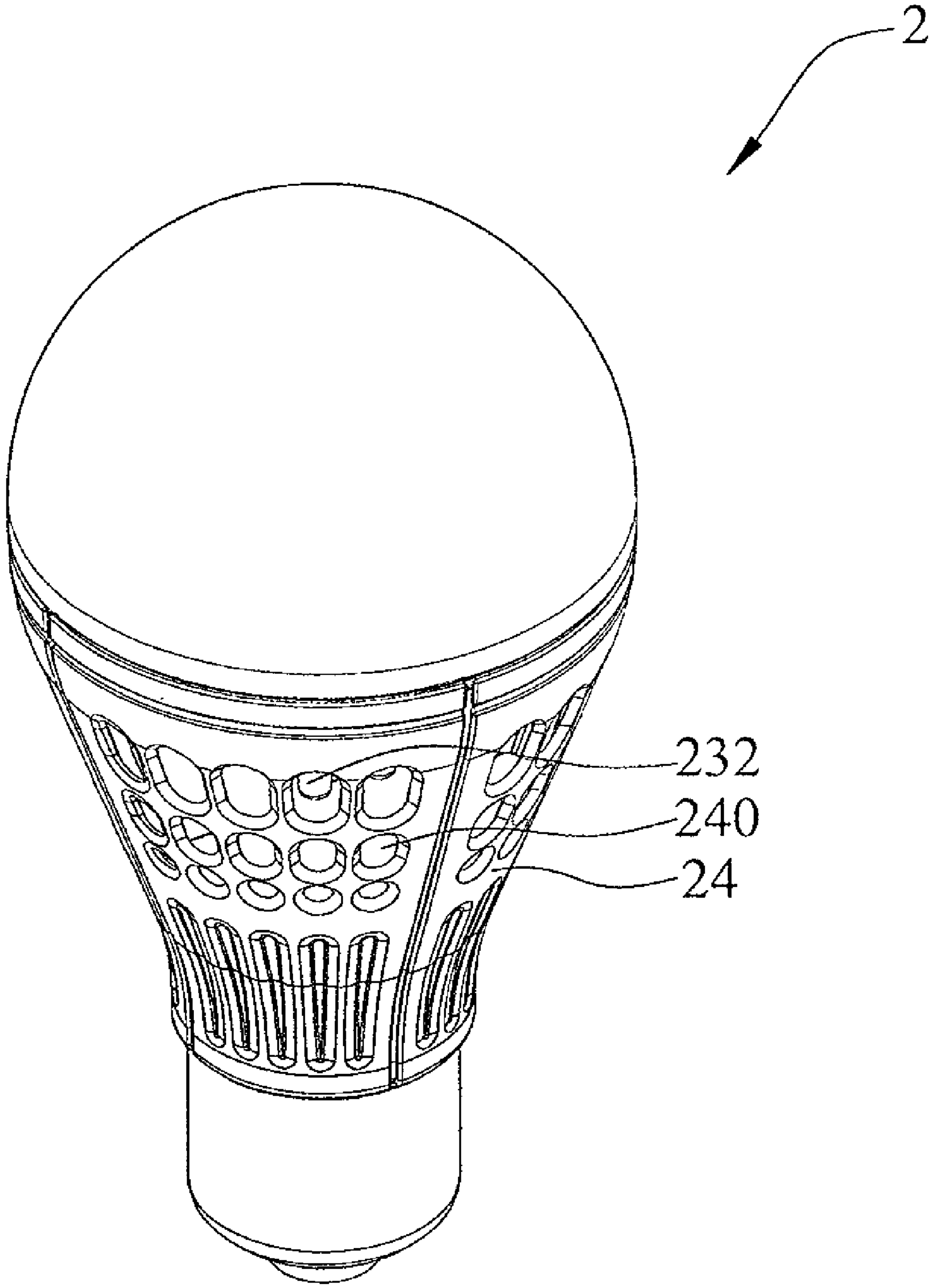

FIGS. 2A and 2B are an exploded view and an assembly view, respectively, of an LED bulb 2 according to the present invention.

Figure 3:
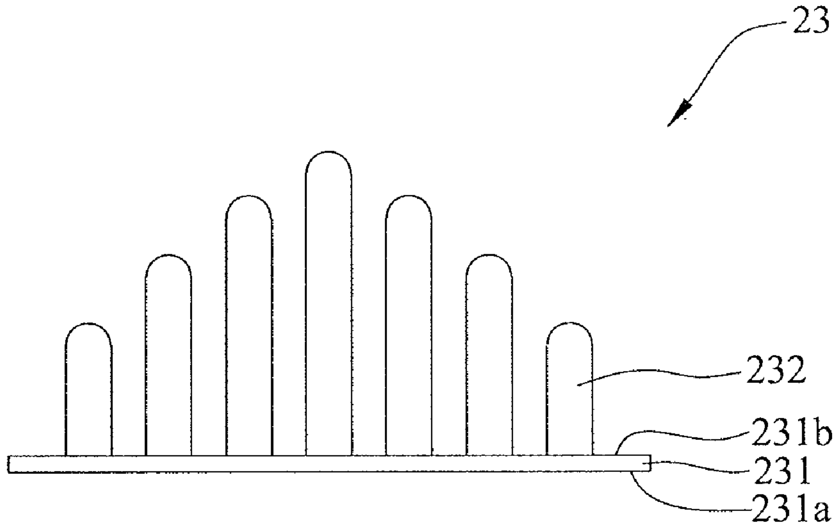
FIG. 3 is a side view showing an embodiment of a heat dissipating structure of the LED bulb according to the present invention.

Referring to FIGS. 2A and 2B, the LED bulb 2 comprises: a circuit board 21 having a first surface 21*a* and a second surface 21*b* opposite to the first surface 21*a*; a plurality of LEDs 22 disposed on the first surface 21*a*; and a heat dissipating structure 23 comprising a heat dissipating board 231, wherein the heat dissipating board 231 has a third surface 231*a* and a fourth surface 231*b* opposite to the third surface 231*a*, the third surface 231*a* of the heat dissipating board 231 is attached to the second surface 21*b* of the circuit board 21, and the fourth surface 231*b* of the heat dissipating board 231 has a plurality of heat dissipating bumps 232 disposed thereon. Further, as shown in FIG. 3, which is a side view of the heat dissipating structure 23, the heat dissipating bumps 232 gradually decrease in length from the center toward the periphery of the fourth surface 231*b*.

In an embodiment of the present invention, the above-described heat dissipating structure 23 can be formed by die casting.

In an embodiment of the present invention, the above-described LED bulb further comprises a housing 24 disposed around the circuit board 21 and the heat dissipating structure 23, and a plurality of openings 240 is disposed in the housing 24 and positioned around the heat dissipating bumps 232. In particular, a heat dissipating space 28 is formed near the LEDs 22 that generate heat, and the heat dissipating structure 23 is received in the heat dissipating space 28. In an embodiment of the present invention, the heat dissipating structure 23 is preferably made of metal, and the third surface 231*a* of the heat dissipating board 231 is attached to the second surface 21*b* of the circuit board 21 preferably through a thermal paste so as to improve the heat conducting efficiency.

Referring to FIG. 2A, the edges of the circuit board 21 and the heat dissipating structure 23 engage with a groove 241 inside the housing 24, and another groove 242 disposed on the outside of the housing 24 engages with the edge of a cover 25, thereby facilitating the assembly of the LED bulb and saving cost. The cover 25, a power driver 26 and an electrical contact 27 shown in FIGS. 2A and 2B can be provided as known in the prior art, and accordingly detailed description thereof is omitted herein.

According to the above-described structure, heat generated by the circuit board 21 and the LEDs 22 is conducted to the heat dissipating bumps 232 of the heat dissipating structure 23. Since the heat dissipating bumps 232 located in the center of the heat dissipating structure 23 are longer than the heat dissipating bumps 232 located around the periphery of the heat dissipating structure 23, the heat dissipating bumps 232 located in the center of the heat dissipating structure 23 have a larger heat dissipating area for effectively dissipating heat in the center of the circuit board 21, and the shorter heat dissipating bumps 232 located around the periphery of the heat dissipating structure 23 will not block the flow of air in the center. As such, heat in the center can be rapidly dissipated by the heat dissipating bumps 232 through air convection. Furthermore, the openings 240 disposed in the housing 24 cause hot air to be rapidly dissipated out of the LED bulb 2 in all directions (360 degrees), thereby increasing the heat dissipating efficiency.

Figure 4:
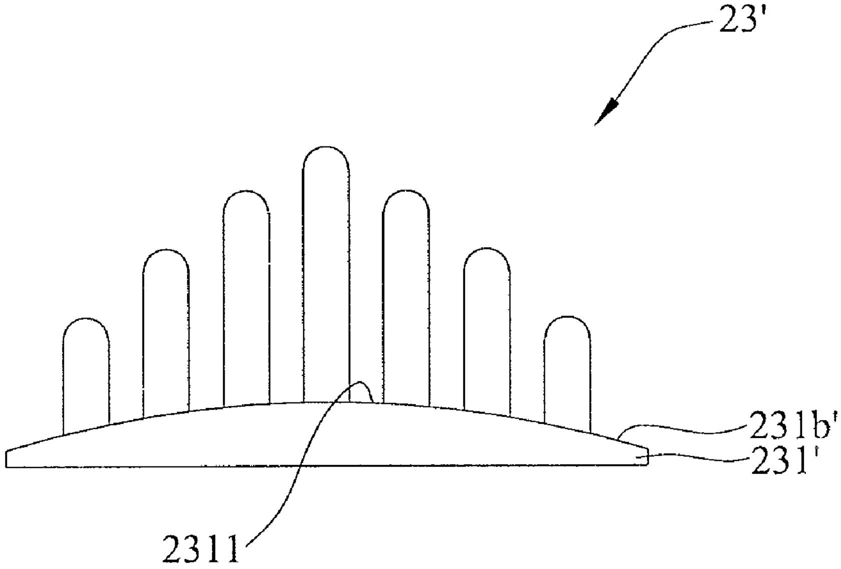
FIG. 4 is a side view showing another embodiment of the heat dissipating structure of the LED bulb according to the present invention.

FIG. 4 shows another embodiment of the heat dissipating structure according to the present invention. For purpose of simplification, only the difference of the present embodiment from the previous embodiment of FIG. 3 is described herein. Referring to FIG. 4, the heat dissipating board 231' of the heat dissipating structure 23' has a protruding portion 2311 with a height gradually decreasing from the center toward the periphery of the fourth surface 231*b*' so as to increase the heat dissipating area.

In the LED bulb of the present invention, the heat dissipating bumps 232 can have, but not limited to, a triangular pyramid shape, a square pyramid shape, a polygonal pyramid shape, a triangular tapered column shape, a square tapered column shape, a polygonal tapered column shape, a round column shape, a square column shape or a polygonal column shape.

In addition, the present invention can comprise a nano-scaled radiation coating that is disposed on heat dissipating bumps 232 through spray coating, for example, so as to further improve the heat dissipating efficiency.

Therefore, the housing of the LED bulb of the present invention has a heat dissipating space formed near the LEDs that generate heat for receiving a heat dissipating structure, wherein the heat dissipating structure comprises a heat dissipating board having one surface attached to the circuit board having the LEDs and the other surface having a plurality of heat dissipating bumps disposed thereon and gradually decreasing in length from the center toward the periphery of the heat dissipating board. The heat dissipating bumps that gradually decrease in length from the center toward the periphery of the heat dissipating board facilitate rapid dissipation of hot air in the center and the openings disposed around the heat dissipating structure also help to dissipate heat. Further, the heat dissipating space, the heat dissipating bumps and the openings disposed in the housing facilitate thermal convection. As such, the overall heat dissipating effect is improved so as to maintain the LED bulb at a normal temperature, thereby increasing the light emitting efficiency and lifetime of the LED bulb.

The above-described descriptions of the detailed embodiments are intended to illustrate the preferred implementation according to the present invention but are not intended to limit the scope of the present invention. Accordingly, all modifications and variations completed by those with ordinary skill in the art should fall within the scope of present invention defined by the appended claims.

What is claimed is:

1. An LED bulb 2, comprising:

a circuit board 21 having a first surface and a second surface opposite to the first surface;

a plurality of LEDs 22 disposed on the first surface of the circuit board; and a heat dissipating structure 23 having a heat dissipating board, wherein the heat dissipating board has a third surface and a fourth surface opposite to the third surface, the third surface is attached to the second surface of the circuit board, and a plurality of heat dissipating bumps are disposed on the fourth surface and gradually decrease in length from a center toward a periphery of the fourth surface;

a cover 25 engaged on top of housing 24 to form the closed LED bulb, wherein the cover has no opening on the top, wherein the LEDs are positioned upwards and covered by the cover; and said housing 24 disposed around the circuit board and the heat dissipating structure, wherein the heat dissipating structure is positioned downwards in the housing, wherein the housing has a plurality of openings 240 positioned around the heat dissipating structure in such a way as to draw the heat away from the LEDs on the circuit board through the heat dissipating structure and out of the heat dissipating space through the openings in the housing via air convection in all directions.

2. The LED bulb of claim 1, wherein the fourth surface of the heat dissipating board has a protruding portion with a height gradually decreasing from the center toward the periphery of the fourth surface.

3. The LED bulb of claim 1, wherein the heat dissipating structure is made of metal.

4. The LED bulb of claim 1, wherein the heat dissipating structure is formed by die casting.

5. The LED bulb of claim 1, wherein the LED bulb is designed to follow the form factor of a traditional bulb.

6. The LED bulb of claim 1, further comprising a separator 250 that encloses and separates a power driver 26 and an electrical contact 27 at the bottom portion of the LED bulb from the circuit board and the heat dissipating structure at the top portion of the bulb so that the power driver is mechanically and thermally isolated from the circuit board and the heat dissipating structure.

7. The LED bulb of claim 1, further comprising a heat dissipating space 28 created by the housing wherein the heat dissipating space contains the heat dissipating structure.

* * * * *